United States Patent [19]
Ryon et al.

[11] Patent Number: 5,794,345
[45] Date of Patent: Aug. 18, 1998

[54] FOLDING POCKET SAW

[75] Inventors: Randall C. Ryon, Victor; Richard M. Baran, Webster, both of N.Y.

[73] Assignee: Sawvivor Inc., Webster, N.Y.

[21] Appl. No.: 800,527

[22] Filed: Feb. 19, 1997

[51] Int. Cl.[6] .................................................. B27B 21/00
[52] U.S. Cl. ............................ 30/144; 30/153; 30/517
[58] Field of Search .............................. 30/504, 514, 517, 30/521, 340, 47, 526, 153, 144; D8/97, 301, 306, 107

[56] References Cited

U.S. PATENT DOCUMENTS 850,481  4/1907  Lomoff .................................. 30/504
1,549,545  8/1925  Hickman .............................. 30/153

*Primary Examiner*—Douglas D. Watts
*Attorney, Agent, or Firm*—Robert J. Bird

[57] ABSTRACT

A folding saw includes a double edge saw blade first and second frame members pivotally connected to one end of the blade, and first and second handles pivotally joined to the first and second frame members respectively. Frame members and handles are movable between a closed configuration covering the edges of the blade, and an open configuration in which they together form the saw handle. The first and second handles lock together in both configurations. One handle member includes a retractable knife blade.

5 Claims, 2 Drawing Sheets

5,794,345

FOLDING POCKET SAW

FIELD OF THE INVENTION

This invention is a multi-purpose saw, or field saw, which is collapsible and foldable into a compact portable unit.

BACKGROUND AND INFORMATION DISCLOSURE

Field saws are available in a variety of styles, sizes, and configurations Some are collapsible, some are foldable, some are just small for easy storage. A desired characteristic of a field saw is that it be packable.

Prior art that we know about includes the "Pac-Saw" manufactured by Nat-Pro. It includes a double-edge blade with a T-handle which is split down the middle. The halves of the handle are pivotable on the blade, from back to back positions at which they form the T-handle, to positions along opposite edges of the blade for sheathing. In this latter position, the handle halves cover about one third of the length of the saw blade. The exposed two-thirds must still be sheathed for safety.

SUMMARY OF THE INVENTION

A folding saw according to this invention includes a double edge saw blade, first and second frame members pivotally connected to one end of the blade, and first and second handles pivotally joined to the first and second frame members respectively. The frame members and handles are movable between a closed configuration covering the edges of the blade, and an open configuration in which they together form the saw handle. The first and second handles lock together in both configurations.

DRAWING

DESCRIPTION

Figure 1:
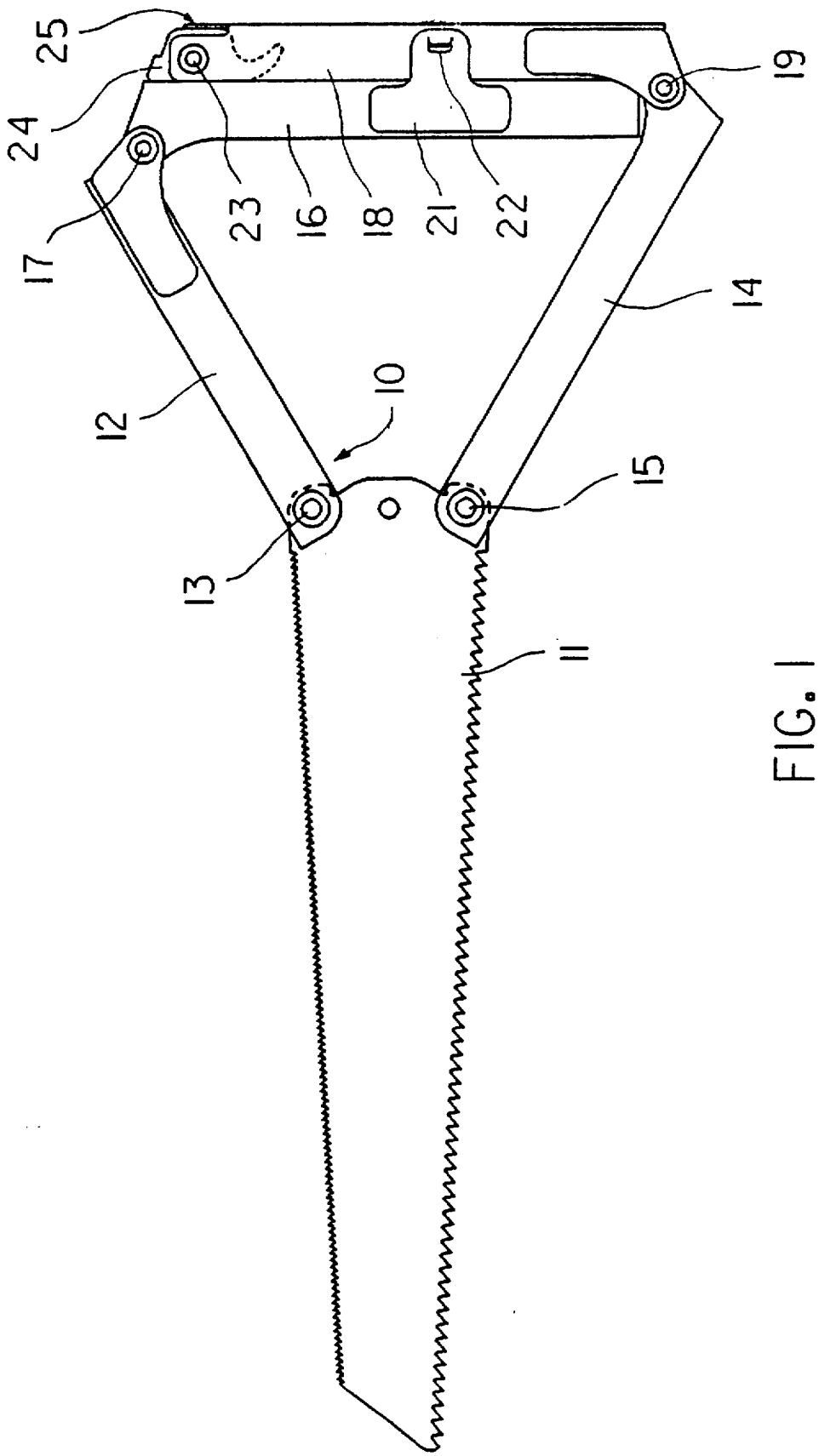
FIG. 1 shows our saw in its open configuration.

Referring to FIG. 1, our saw 10 includes an elongated double-edge saw blade 11. A first frame member 12 is pivotally connected to one end of the blade 11 by a hinge 13. A second frame member 14 is pivotally connected to the same end of the blade 11 by a hinge 15. Hinges 13, 15 are at the handle end of the blade 11, near its upper and lower edges respectively.

A first handle 16 is pivotally connected to the end of the first frame member 12, as an extension of it, by a hinge 17. A second handle 18 is similarly connected to the end of the second frame member 14 by a hinge 19. Pivotal movements about the several hinges 13, 15, 17, 19 are all in the plane of the saw blade 11.

Figures 2, 3:
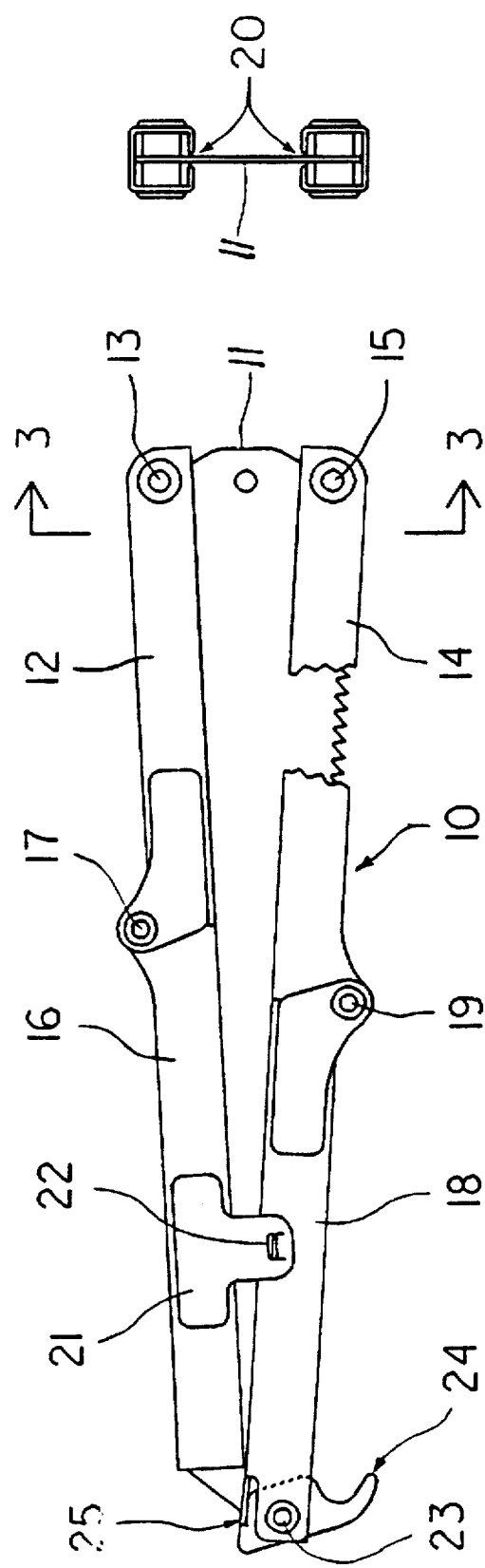
FIG. 2 shows our saw in its closed configuration.
FIG. 3 is a transverse section on the plane 3—3 of FIG. 2.

FIG. 3 shows the frame members 12, 14 and handles 16, 18 as hollow square channels, each with a slot 20 along its length. FIG. 2 shows the channel members 12, 14, 16, 18 pivoted to their closed position to cover the edges of the saw blade 11. A resilient latch 21 on the handle 16 snaps into engagement with a lock 22 on the handle 18 to lock the entire saw 10 in this closed configuration. The hinges 17, 19 are over-center hinges so they do not interfere with continuity of the slots 20. Portions of the frame member 12 and handle 16 are broken away in FIG. 2 to show the saw blade 11 relative to them.

FIG. 1 shows the saw 10 in its open or operative configuration. The first and second frame members 12, 14 are pivoted out from the blade 11. The first and second handles 16, 18 are, in turn, pivoted into positions in which the second handle 18 overlies the first handle 16. In this position, once again, the latch 21 on the handle 16 snaps into engagement with the lock 22 on the handle 18 to lock the entire saw 10 in this operative configuration. The second frame member 14 is longer than the first frame member 12 to permit the handle 18 thus to overlie the handle 16.

A knife blade 24 is mounted on the distal end of the second handle 18 by a hinge 23 for pivotal movement between a retracted position within the channeled handle 18 (FIG. 1) and an exposed position for use (FIG. 2). Pivotal movement of the blade 24 is somewhat frictional as a convenience to keep the blade from swinging loosely between retracted and open positions. The knife blade 24 is one example of a number of auxiliary tools that might be pivotally mounted on the handle, in the manner of the Swiss Army knife.

There are several advantages and features to our pocket saw. The frame members and handles together provide a sheath for the saw blade and for its safe handling and storage. The handles provide a comfortable grip on flat surfaces, instead of a painful grip against thin edges of channel members. The frame members 12 and 14 are above and below the grip, and they protect the hand. The assembled saw, open or closed, is taut and rigid. The same latch mechanism locks the assembly in place in its open configuration and in its closed configuration.

The folding saw of this invention is a handy and portable tool particularly advantageous for camping, backpacking, hunting, survival and the like.

The foregoing description of a preferred embodiment of this invention, including any dimensions, angles, or proportions, is intended as illustrative. The concept and scope of the invention are limited only by the following claims and equivalents thereof.

What is claimed is:

1. A folding saw, including:

an elongated saw blade;

first and second frame members pivotally connected to one end of said blade adjacent respectively to upper and lower edges thereof;

first and second handles pivotally connected to said first and second frame members respectively as extensions thereof;

said frame members and said handles pivotable between a closed configuration overlying edges of said blade, and an open configuration with one said handle overlying the other;

locking means on said first and second handles operable in both said closed configuration and in said open configuration to lock said handles together; and an auxiliary tool mounted on one of said handles for pivotal movement between a retracted position within said handle and an exposed position.

2. A folding saw as defined in claim 1, wherein said auxiliary tool is a knife blade.

3. A folding saw, including:

an elongated double edge saw blade;

first and second frame members pivotally connected to one end of said blade adjacent respectively to upper and lower edges thereof;

first and second handles pivotally connected to said first and second frame members respectively as extensions thereof;

said frame members and said handles pivotable between a closed configuration overlying edges of said blade, and an open configuration with said second handle overlying said first handle; and first and second locking members on said first and second handles respectively, said locking members cooperating in both said closed configuration and in said open configuration to lock said handles together, wherein said second frame member is longer than said first frame member to adapt said second handle to overlie said first handle.

4. A folding saw, including:

an elongated double edge saw blade;

first and second frame members pivotally connected to one end of said blade adjacent respectively to upper and lower edges thereof;

first and second handles pivotally connected to said first and second frame members respectively as extensions thereof;

said frame members and said handles pivotable between a closed configuration overlying edges of said blade, and an open configuration with said second handle overlying said first handle;

first and second locking members on said first and second handles respectively, said locking members cooperating in both said closed configuration and in said open configuration to lock said handles together; and an auxiliary tool mounted on one of said handles for pivotal movement between a retracted position within said handle and an exposed position.

5. A folding saw as defined in claim 3, wherein said auxiliary tool is a knife blade.

* * * * *